Oct. 17, 1950     R. H. MILLER     2,526,257
DIAL INDICATOR CONTROL DEVICE
Filed Feb. 7, 1948        4 Sheets-Sheet 1
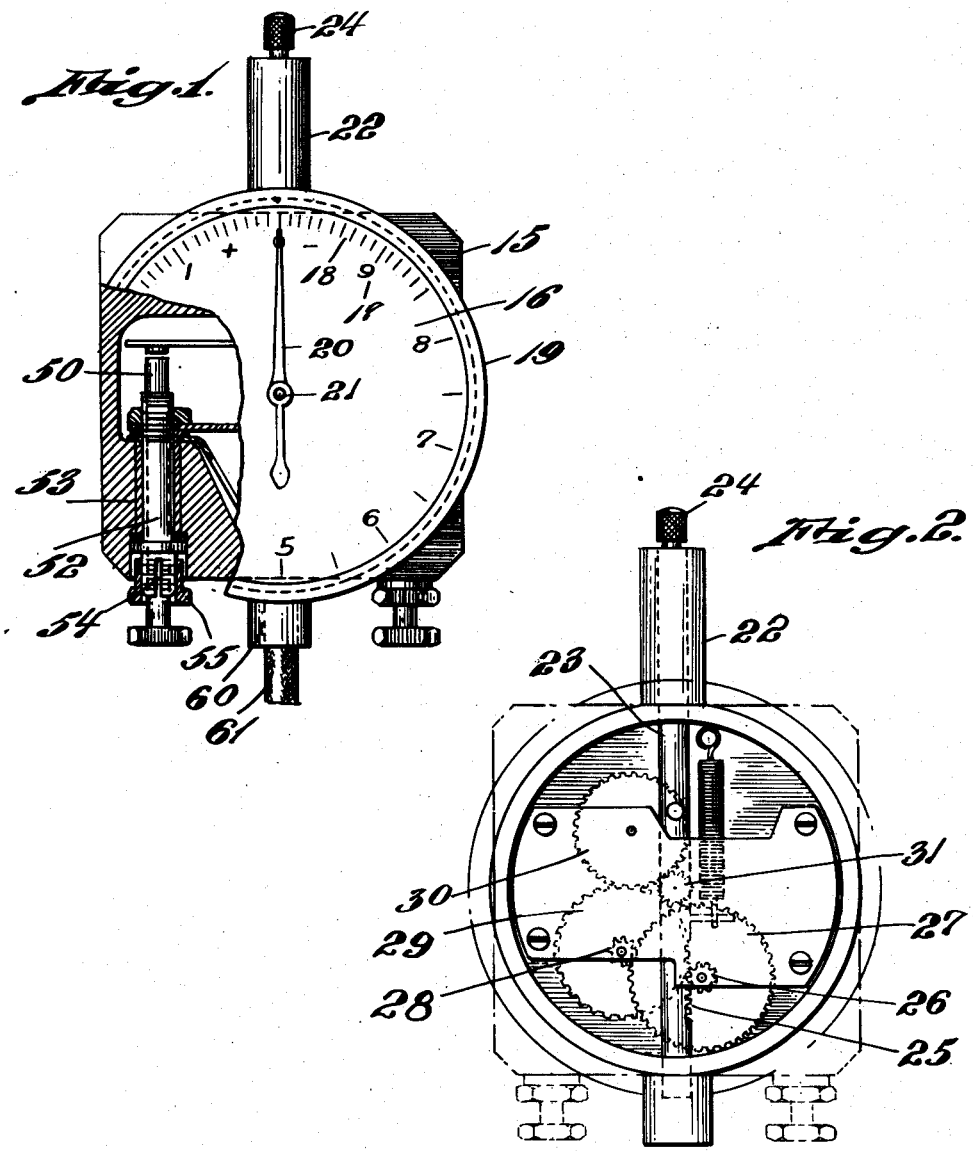
INVENTOR.
Raymond H. Miller
BY Barlow & Barlow
ATTORNEYS.

Oct. 17, 1950 — R. H. MILLER — 2,526,257
DIAL INDICATOR CONTROL DEVICE
Filed Feb. 7, 1948 — 4 Sheets-Sheet 2
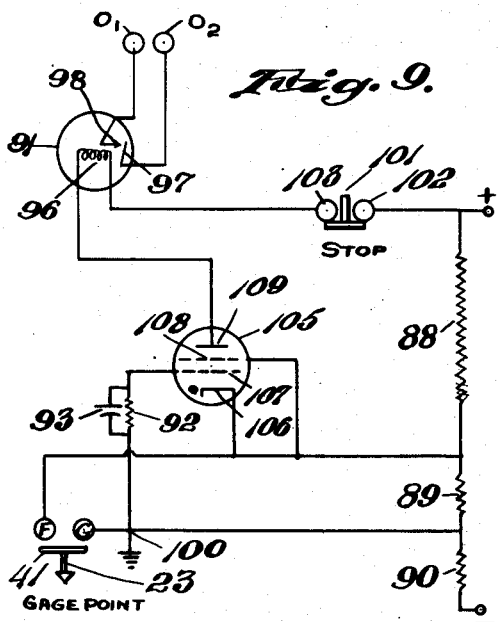
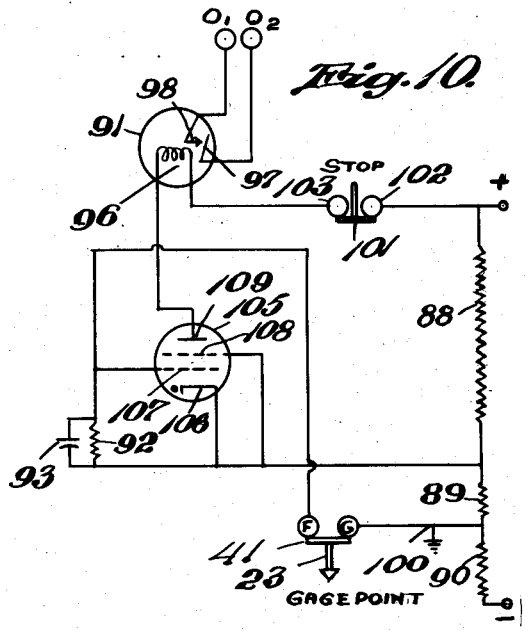
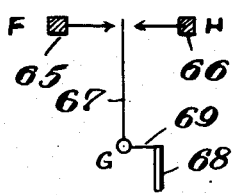
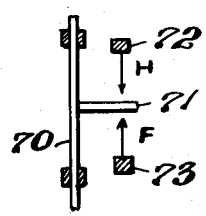
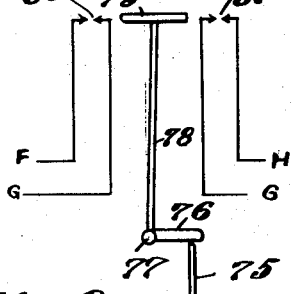
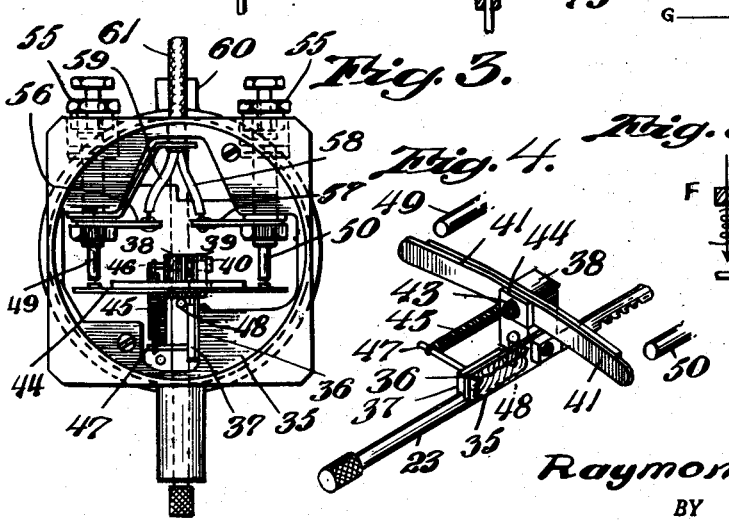
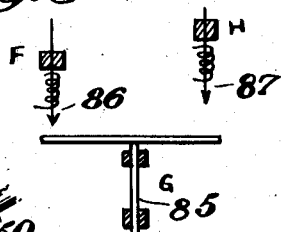
INVENTOR.
Raymond H. Miller
BY Barlow & Barlow
ATTORNEYS.

Patented Oct. 17, 1950

2,526,257

UNITED STATES PATENT OFFICE 2,526,257

DIAL INDICATOR CONTROL DEVICE

Raymond H. Miller, Riverside, R. I., assignor to Federal Products Corporation, a corporation of Rhode Island Application February 7, 1948, Serial No. 7,020

7 Claims. (Cl. 175—320)

This invention relates to the association of a dial indicator and an attachment for the electrical control of a machine or apparatus in response to the condition of the work which is measured by the dial indicator.

Although heretofore there has been used a dial indicator and some sort of an electrical circuit which will operate upon a switch being closed when the work becomes a certain size, there has never been such a tie-in between the dial indicator and the circuit that the operator may know how close he is to the limits where the circuit will close and some other operation occur. Also, usually where an electrical circuit is used to control the work, the electric circuit will go through the work, and because of the contacts which have to be used and other mechanism, there is always some question as to the reliance that may be placed upon the electrical operation. Further, where there is electric control provided, there is apt to be a burning of the points where there is a closing and opening of the circuit, and thus by reason of this burning, a high degree of accuracy in the operation cannot be relied upon. Also, it is found that where large and heavy structures are utilized, that vibration is apt to affect the operation, and in order that there will be no reverse when one step starts to perform, some very complicated structure is often utilized for preventing any such reverse. Further, in structures of this character with which I am familiar, they are not fully mechanical, and it is required that the operator press some button or do some other act in order that the sequence in operations may be perfect. This dependency upon the human element often breaks down by human failure, and thus some of the work will be spoiled.

One of the objects of this invention is to provide such a control linkage between the dial gauge or dial indicator and the electrical control circuit that the operator will know exactly how close he is to either limit of the size where a contact will close to cause some other change to happen.

Another object of this invention is to provide an electric circuit which will avoid the necessity of a part of the circuit going through the work, but rather will depend upon tubes and relays so that a more reliable action will be provided.

Another object of this invention is to by reason of the tubes and relays provide a circuit where no burning of the points will occur by reason of the breaking of the circuit; and thus a circuit where there will be a higher degree of accuracy than heretofore.

Another object of this invention is to provide a circuit which will lock against a reverse when one step in the cycle is started.

Another object of this invention is to provide an arrangement which will be more completely mechanical and require less attention of the human element, such as an operator, than circuits which have heretofore been utilized.

With these and other objects in view, the invention consists of certain novel features of construction as will be more fully described and particularly pointed out in the appended claims.

In the accompanying drawings:

Figure 1 is a plan view of a dial indicator partly broken away and shown in section to indicate certain of the operating parts thereof;

Figure 2 is a view of the opposite side of the structure shown in Figure 1 and illustrating the mechanical connection between the rack plunger and the dial hand for causing the same to operate with certain removed parts indicated in dotted lines;

Figure 3 is also a rear view showing the dial indicator in a reversed or upside down position with reference to Figures 1 and 2, but illustrating the contact action which is had by reason of the movement of the rack or plunger;

Figure 4 is a perspective view of the rack and plunger movement and the contacts which are engaged;

Figure 11:
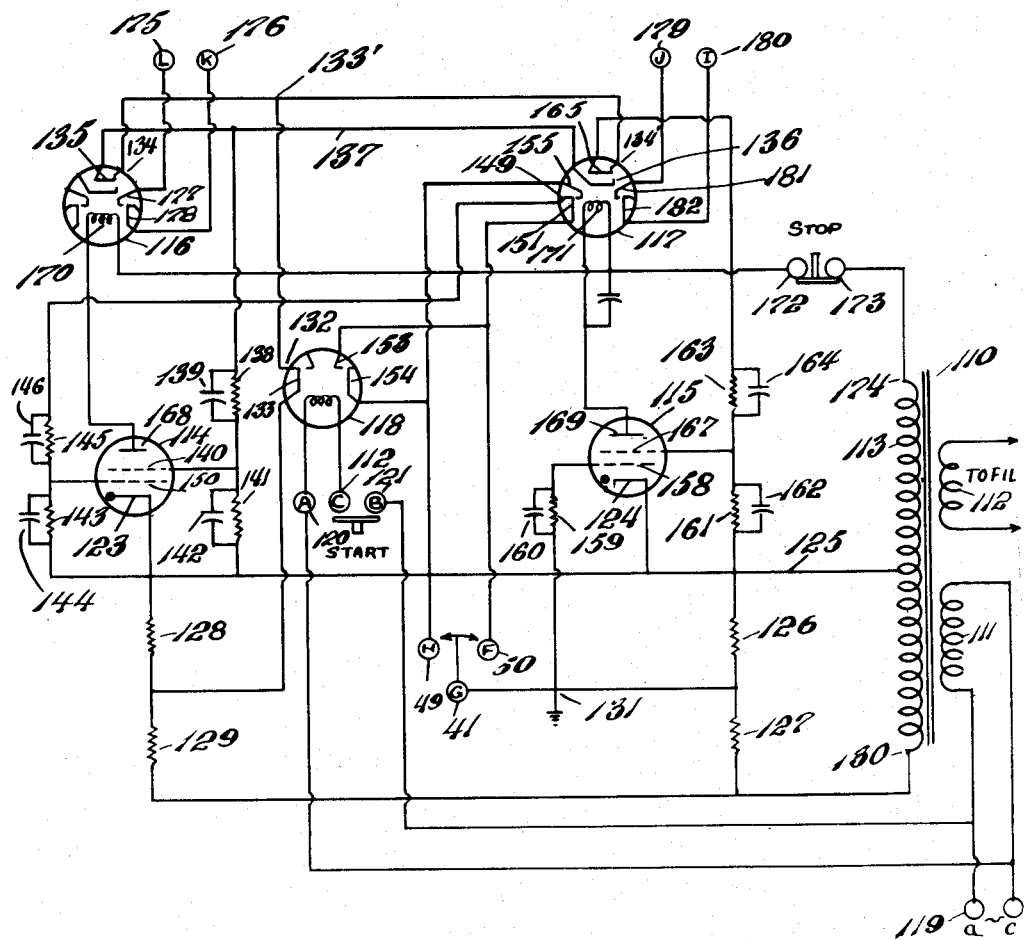

Figures 5 to 8 inclusive are diagrammatic views illustrating various movements which may occur to make or break the contacts which may be variously arranged, and are in effect modifications; and Figures 9, 10, 11, and 12 and 13 are diagrammatic views illustrating various circuits which may be utilized in connection with the closing of the contacts for performing different operations where different power sources are available.

In proceeding with this invention, I utilize a dial indicator having a plunger with a rack which operates a train of gears to cause the movement of a hand over a dial in the desired multiplication of movement which is required, and I also provide contact arms which are actuated by the movement of the plunger which also operates the dial hand, so that when the plunger moves in one direction beyond a set limit, one contact will be closed; whereas, when the plunger moves in the other direction beyond a set limit, the other contact will close, and I lead from each of these fixed contacts with which the contact arm engages suitable electrical conducting wires for the operation of a circuit which will perform certain desired functions. The arm which is moved in response to the movement of the plunger may be variously arranged, and likewise the contacts which are closed may be variously arranged, and I have illustrated several different arrangements for carrying out the same basic idea.

With reference to the drawings, particularly Figures 1 and 2 I have shown a casing designated 15 which carries a dial 16 having various graduations 18 with indications 17 thereon covered by a glass held by a bezel 19. A dial hand 20 is fixed upon a staff 21 so as to sweep over the dial 16 in response to certain motion which is communicated to it.

A sleeve 22 extends from the casing and provides a guide through which the plunger 23 having a feeler end 24 is slidable. This plunger is provided with a plurality of rack teeth 25, as shown in Figure 2, and is connected to the staff 21 of the pointer through a train of gears designated 26, 27, 28, 29, 30, and 31 the latter of which is on the staff 21. This will cause a multiplication and communication of motion from the plunger 23 to the dial hand 20 causing it to rotate over the dial 16.

With reference more particularly to Figures 3 and 4, the casing is provided with a solid portion 35 which has a spring steel leaf 36 clamped against one face thereof by means of a block 37. This spring extends upwardly beyond the portion 35 and supports a block 38 which is clamped thereto by means of the plate 39 and screw 40. The block has secured to it the contact arm 41 which is clamped to the block by a screw 43 and plate 44. A spring 45 engages the pin 46 on the block 38 and a pin 47 on the clamping plate 37 which tends to swing the block and its arms counterclockwise about an axis somewhere along the hinge plate 36. A pin having a rounded head 48 extends laterally from the plunger 23 so as to engage the under side of the block 38 and prevent it from being moved by the spring 45 beyond the position permitted by the position of the plunger 23.

The contact arm 41 may engage the contact 49 or the contact 50. These contacts 49 and 50 are pins which are adjustably mounted in the casing, as shown more plainly in Figure 1. A sleeve 52 is positioned in the insulation 53, and this sleeve is split as at 54 at one end. The pin, either 49 or 50, is positioned in the sleeve and is held in adjusted position therein by a nut 55 which when threaded upon the split portion of the sleeve will contract the sleeve and bind the pin in the sleeve. Thus, if it is desired to cause the instrument to operate by reason of an electrical contact at one certain point, it is merely necessary to set the pin 50 so that when the indicator hand 20 reaches that location, the contact will be closed; likewise, on the other limit, it is merely necessary to set the other pin 49 so that when the dial indicator hand 20 reaches that position, the other contact will be closed and when the plunger is in a position in between these two, then both contacts will be open.

The contact 50 is connected to some outside source by a wire 58 attached as at 57, while the contact 49 would be attached to some outside source by a wire 59 attached to the terminal at 56. These wires 58 and 59 may be led from the casing through an opening in case 15 and can be braided together as at 61.

In Figure 5, I have illustrated diagrammatically contacts as 65 and 66 with a single closure arm 67 arranged to be operated by plunger 68 about a lever arm 69 so that movement of the arm back and forth will close either one or the other of the contacts. In Figure 6 the plunger is designated as 70 with a laterally extending portion 71 which will engage either the contacts 72 or 73 depending upon whether this laterally extending portion moves upwardly or downwardly. In Figure 7 the plunger is designated 75 and acts upon an arm 76 which is pivoted as at 77 to swing another arm of a lever 78 having a head 79 back and forth to close the pair of contacts 80 or 81 depending upon its position and direction of motion, this being indicated as a two-wire circuit. In Figure 8 the plunger 85 may move upwardly to close one contact as at 86 which is spring-pressed downwardly and upon further movement will engage the other contact 87 which is also spring-pressed downwardly, and yet the plunger may continue to operate upwardly after it contacts both. Any of these closure contacts may be used for the control of a circuit hereinafter described.

Referring to Figures 9 and 10, there are shown single action direct current electric gauge circuits, each having a source of direct current shown by positive and negative terminal signs, a thyratron control tube 105, and a single control relay 91. Across the source of direct current, there is connected a voltage divider network comprising serially connected resistances 88, 89, and 90. Each anode 109 of the thyratron tubes 105 is connected through relay winding 96 and then through terminals 102 and 103 of the stop button to the positive side of the direct current source. The screen grids 108 (as well as the cathodes 106) of the thyratron tubes 105 are connected to the juncture point of resistances 88 and 89. Control circuit terminals $O_1$ and $O_2$ are connected respectively to normally open contact 98 and armature 97 of relay 91. In Figure 9, the grid 107 of thyratron tube 105 is connected through a grid impedance network consisting of resistance 92 and capacitance 93 to the juncture point of resistance 89 and 90. The contact arm 41 of the indicator switch assembly, shown generally in Figure 3, which may short out resistance 89 of the voltage dividing network through contacts F and G, normally leaves an open circuit between contacts F and G. An electrical tie point 100, which may be a ground connection as shown, is conveniently connected to the juncture points of resistances 89 and 90.

In Figure 10, the grid 107 of thyratron control tube 105 is connected through grid impedance network consisting of resistance 92 and capacitance 93 to the cathode 106, and also to normally closed control contacts F and G and the juncture point of resistance 89 and 90. It will be noted that Figures 9 and 10 are similar in structure, the distinguishing feature being found in the grid control circuit. The firing of the tube in Figure 9 is predicated on the fact that the control contacts F and G will close, thereby effectively shorting the negative bias voltage output from the section of the voltage divider consisting of resistance 89; while in Figure 10 the tube will fire upon the opening of the control contacts F and G which removes the negative bias voltage developed across resistance 89 from the grid 107 of the tube. In both circuits, the grid voltage is raised to the cathode potential by the switch action which insures firing of the tube.

The grid control circuits of these control devices, shown in Figures 9 and 10, operate in somewhat the same manner as the alternating current preferred embodiment shown in Figure 11. In order for the control grid thyratron tubes to fire, the grid voltage must be raised to approximately cathode potential. The voltage applied to the grids, it will be noted, is supplied from a point on the voltage divider network which is negative with respect to the cathode potential. When this voltage is applied to the grids, it will set up a condition which will prevent firing of the tubes. Taking for example the operation of Figure 9, the tube is shown nonconductive and will fire when contacts F and G are closed, thereby shorting out the grid bias applied to the tube. The firing of the tube causes a flow of current through the relay coil 96, thereby attracting armature 97 and closing the external circuit between terminals $O_1$ and $O_2$. Once the contacts F and G have closed and initiated the firing of the tube, the tube will continue to fire regardless of the re-opening of contacts F and G until the stop button is pressed. This is due to the fact that once the gas in the tube has ionized, it will continue to conduct current, regardless of any voltage applied on any of the grids, as is well known in the art, and in order to cease firing, the anode potential must be interrupted. Thus, I have described a D. C. control circuit modification which embodies the same non-repetitive feature as that shown in Figure 11.

The operation of Figure 10 is the same in operation as the circuit of Figure 9, except that the initial firing of the tube is predicated on the fact that the contacts F and G will be open. It will be noted that in Figure 9, control contacts were closed to initiate firing. The opening of the contacts in Figure 10 will also raise the voltage on the control grid to the cathode potential, as there is a current limiting and grid impedance network in the control grid-cathode circuit.

Referring to Figure 11 of the invention, the electric circuit consists of transformer 110 having a primary winding 111 and two secondary windings 112 and 113, two thyratron type tubes 114 and 115, two three-pole, double-throw control relays 116 and 117 and a two-pole, double-throw starting relay 118.

A source of alternating current power is applied to terminals 119 energizing primary 111 and supplying voltage to terminals 120 and 121 of starting relay contacts. Secondary winding 112 provides heating current to the filaments, which for simplicity are not illustrated, of the thyratron type tubes 114 and 115, and secondary winding 113 supplies plate voltage to said tubes. The center tap of transformer secondary 113 is connected to cathodes 123 and 124 of tubes 114 and 115 through lead 125. A voltage divider network comprising serially-connected resistors 126 and 127 and a second voltage divider network comprising serially-connected resistors 128 and 129 are connected in parallel between terminal 130 of secondary winding 113 and the center tap of said secondary winding. The juncture of resistances 126 and 127 is connected to an electrical tie-point at 131, and the juncture of resistances 128 and 129 is connected through normally closed contact 132 and armature 133 of starting relay 118 and in one branch from tie-point 133' to normally close contact 134 and armature 135 of relay 116, while in another branch it is connected from tie-point 133' to normally closed contact 134' and armature 165 of relay 117. Armature 135 of relay 116 is connected through lead 137 to contact 136 of relay 117 and through an isolating network consisting of parallelly connected resistance 138 and capacitance 139 to secondary grid 140 of thyratron type tube 114. Armature 165 of relay 117 is connected through an isolating network consisting of parallelly connected resistance 163 and capacitance 164 to secondary grid 167 of thyratron type tube 115. The voltage on grid 140 is prevented from "floating" by parallelly connected resistance 141 and capacitance 142 connected between screen grid 140 and cathode 123 of the tube 114. A network comprising resistance 143 and capacitance 144 in parallel, acting as a grid impedance and current limiter, is connected between cathode 123 and grid 150 of tube 114. An isolation network comprising resistance 145 and capacitance 146 in parallel is connected between grid 150 of tube 114 and contact 149 of relay 117. Armature 151 of relay 117 is normally connected to contact 149 of said relay and is also connected to control terminal 50 and contact 153 of relay 118. Control contact 49 is connected to center tap lead 125, armature 154 of relay 118, and contact 155 of relay 117. Control terminal 41 is connected to an electrical tie-point at 131. Grid 158 of tube 115 is connected through a grid impedance and current limiting network consisting of parallelly connected resistance 159 and capacitance 160 to electrical tie-point at 131. A network consisting of parallelly connected resistance 161 and capacitance 162, which prevents the grid from "floating," is connected between secondary grid 167 and cathode 124 of tube 115. An isolation network consisting of parallelly connected resistance 163 and capacitance 164 is connected between secondary grid 167 of tube 115 and armature 165 of relay 117.

The anodes 168 and 169 of the two Thyratron type tubes 114 and 115 are connected, respectively, to the coils 170 and 171 of the relays 116 and 117. These relay coils are, in turn, connected through stop-button contacts 172 and 173 to contact 174 of the secondary winding 113. First control circuit terminals 175 and 176 are connected, respectively, to normally open contact 177 and armature 178 of relay 116. Second control circuit terminals 179 and 180 are connected, respectively, to normally open contact 181 and armature 182 of relay 117.

In the preferred embodiments of this invention, Figures 1–7, control terminals 41, 49, and 50 are connected to a measuring gauge head which is connected to terminal 41 and which has two stationary but adjustable contacts 49 and 50, respectively. If, while measuring, the pointer of the indicator moves far enough away from its central position, it will make contact with either terminal 49 or 50, thereby completing either one or the other control circuit. Thus, with such an arrangement, it will be seen that it is impossible to close both circuits simultaneously and neither tube will be controlled until the indicator pointer moves a predetermined distance away from its central position.

There are two complete control circuits in the embodiment of Figure 11: one, through tube 114 and the relay 116; the other, through tube 115 and the relay 117 both completed by the transformer winding 113. When tube 115 fires, it energizes relay 117 and closes a circuit between terminals 179 and 180; and, when tube 114 fires, it energizes relay 116, thereby closing a second circuit between contacts 175 and 176.

It is well known in the art that Thyratron type tubes will fire only when their anodes have a positive voltage applied to them with respect to the cathodes, and since the secondary of transformer 110 applies to the anodes of the tubes, an alternating voltage I will consider only the half cycles when the anode voltage is positive, at which time the voltages for the grid control are negative. Since the voltage divider networks and the tube anodes are connected to opposite halves of the same transformer secondary winding, their respective voltages will be 180 electrical degrees out of phase; and if a sufficient voltage is applied from either divider network to a tube grid, that particular tube will be prevented from firing. To obtain grid control, the mid-point of the voltage divider network consisting of resistors 126 and 127 is connected to terminal 41 and also through resistance 159 and capacitance 160 to the control grid 158 of tube 115. The control grid 150 of tube 114 is connected through an isolation network consisting of resistance 145 and capacitance 146 and through relay contacts 149 and 151 to terminal 50. Since the control grid 158 of tube 115 has a negative voltage applied to it by resistance 126, tube 115 can fire only when terminals 41 and 49 are connected together, thereby shorting resistance 126 and allowing the voltage on the control grid 158 of tube 115 to become zero with respect to the cathode. Tube 114 is normally conductive since no bias voltage is applied to the grid 150. Therefore, tube 114 will fire continuously until terminals 41 and 50 are connected together, which will apply to the control grid 150 of tube 114 the bias voltage appearing across resistance 126, thereby stopping the tube. Thus, it will be seen that the tubes will start or stop each time the control contacts 41, 49, and 50 are operated. This is an undesirable condition. To assure that the operation is non-repetitive, the secondary grid of each tube is connected to another voltage divider consisting of resistances 128 and 129 through a pair of normally closed contacts 132 and 133 of relay 118 and then respectively through normally closed contacts 134 and 135 of relay 116 and contacts 165 and 136 of relay 117. Thus, the voltage appearing across resistance 128, when applied to the secondary grid of either tube, will prevent that tube from firing regardless of the voltage appearing on the control grids.

A gauging cycle is begun by pressing the start button, thereby energizing the armature of relay 118 through contacts 121 and 122 and removing the blocking voltage developed across resistance 128 from the secondary grids of both tubes by the opening of contact 132. Therefore, if the control grid of either tube allows that tube to fire, the tube's associated relay will be energized which will break the blocking voltage circuit to the secondary grid of that tube. Relay 118 will be de-energized when start button is released, but the blocking voltage will not be applied to the secondary grid of a tube that is firing. If the bias on a control grid of a tube that is firing is increased or the stop button is pressed, which will break the anode circuit to the tube, the tube will cease to fire and that tube's associated relay will be released and the blocking voltage will be applied to the secondary grid as in the initial condition and the tubes will be prevented from firing again until the start button is pressed.

In the use of the above circuit, I have found that I control plunge cuts during cylindrical grinding to a much closer degree than where either the mechanical device is utilized or where the element of manual control enters to affect the operation of a machine.

Figure 12:
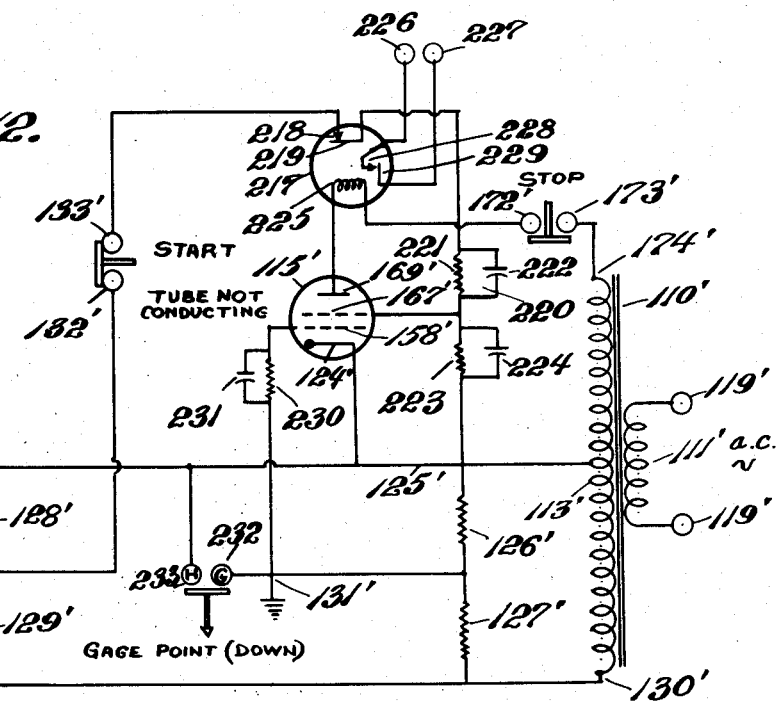
Figure 13:
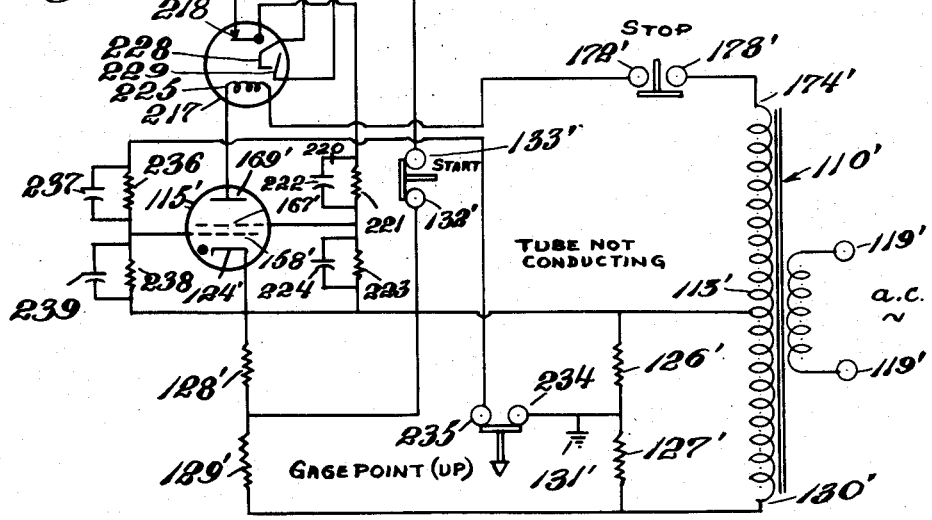

Referring to Figures 12 and 13, the single electric gauge circuit consists of transformer 110' having a primary winding 111' and secondary winding 113', a Thyratron type tube 115' and a two-pole, single-throw control relay 217.

A source of alternating current power is applied to terminals 119' energizing secondary winding 113' to provide plate voltage to said tube 115'. The center tap of transformer secondary 113' is connected to cathode 124' through lead 125'. A voltage divider network comprising serially-connected resistors 126' and 127' and a second voltage divider network comprising serially-connected resistors 128' and 129' are connected in parallel between terminal 130' of secondary winding 113' and the center tap of said secondary winding. The juncture point of resistances 128' and 129' is connected through normally closed contacts 132' and 133' of the start button to normally closed contact 218 and armature 219 of relay 217. Armature 219 of relay 217 is connected through isolating network 220 consisting of parallelly connected resistance 221 and capacitance 222 to secondary grid 167' of Thyratron type tube 115'. The voltage on grid 167' is prevented from "floating" by parallel connected resistance 223 and capacitance 224 connected between screen grid 167' and cathode 124' of tube 115'. Anode 169' is connected through the coil 225 of relay 217, stop-button contacts 172' and 173' to contact 174' of secondary winding 113'. Control circuit terminals 226 and 227 are connected to normally open contact 228 and armature 229 of relay 217.

In Figure 12, the grid 158' of tube 115' is connected through a grid impedance and current limiting network consisting of parallelly connected resistance 230 and capacitance 231 to electrical tie-point 131' and a juncture of resistances 126' and 127'. Control terminal contact 232 is connected to electrical tie-point 131' and control terminal 233 is connected to the center tap of transformer secondary 113'.

In Figure 13, the juncture of resistances 126' and 127' is connected through control terminals 234 and 235 and an isolation network comprising parallelly connected resistance 236 and capacitance 237 to grid 158' of tube 115'. A network comprising parallelly connected resistance 238 and capacitance 239, acting as a grid impedance and current limiter, is connected between cathode 124' and grid 158' of tube 115'.

It will be noted that Figures 12 and 13 are similar in structure, the distinguishing feature being found in the grid control circuit. The firing of the tube in Figure 12 is predicated on the fact that the control contacts 232 and 233 will close thereby effectively shorting the output from the voltage divider, while in Figure 13 the tube will fire upon the opening of the control contacts 234 and 235 which opens the circuit to the grid of the tube. In both circuits the grid voltage is raised to the cathode potential which insures firing of the tube.

The grid control circuits in these control devices, as in Figure 11, operate in the same novel manner. In order for the control tubes to fire the anode voltage must be positive with respect to the cathode voltage and the voltages on the grids must also be at cathode potential. The voltages applied to the grids, it will be noted, are supplied from the opposite half of the secondary winding of the transformer from the anode-cathode potential. This means that at any instant of time the voltages supplied will be 180 electrical degrees out of phase and of opposite polarity. Such a condition will prevent firing of the tubes. Since the voltages applied to the two grids are from separate voltage divider networks, the raising of the voltage of one grid to that of the cathode will not initiate firing unless the voltage on the other grid is also raised to cathode potential. This feature gives rise to the novel non-repetitive feature of the invention.

Taking for example the operation of Figure 12, the tube will fire when contacts 232 and 233 are closed, provided there is no control voltage on the secondary grid 167'. Assume that a control cycle is to be initiated and the contacts 232 and 233 are closed. The "Start" button is pressed thereby opening contacts 132' and 133' and removing the control voltage from secondary grid 167'. Since the output from the control grid voltage divider is shorted and this grid is at cathode potential, the tube will fire. This causes a flow of current through the tube relay coil 225, the upper half 113' of the transformer completing the circuit. The flow of current through the relay coil will attract relay armatures 219 and 229, opening the circuit to the secondary grid 167', in the first instance, and closing the external control circuit, in the second instance. The "Start" button is of the momentarily open-circuit type and will have returned to its initial closed position but there will not be any voltage applied to the secondary grid due to the operation of relay armature 219. The tube will now continue to fire until the "Stop" button is pressed which will open the anode-cathode circuit or until the control circuit contacts 232, 233 are opened which will apply control grid bias to the tube.

Once the tube has ceased to fire, the relay armatures will return to their normal positions, reclosing the secondary grid circuit in the first instance, and opening the external control circuit in the second instance. Once the secondary grid circuit is closed the tube will never refire until the "Start" button is pressed, regardless of the voltage on the control grid. This is the non-repetitive feature.

The operation of the circuit of Figure 13 is the same in operation as the circuit of Figure 12 except that the initial firing of the tube is predicated on the fact that the contacts 234, 235 will be open. It will be noted that in Figure 12 the control contacts were closed. The opening of the contacts in Figure 13 will also raise the voltage on the control grid to the cathode potential, as there is a current limiting and grid impedance network 238, 239 in the control grid-cathode circuit.

From the above, it will be apparent that I may have a tube fire either when the circuit is closed or when the circuit is opened and thus the circuit will be very flexible as to the mechanical arrangement in the gauge which it is used to actuate the circuit.

I claim:

1. In combination, a dial indicator having a primary member movable in response to measurements and a mechanical linkage coupled thereto and to an indicating pointer that moves over a graduated scale, said primary member having mechanically coupled thereto two switches, each of which close a circuit in response to a pre-set measurement, an electronic control circuit, two gaseous discharge tubes, each having an anode, cathode and at least one grid, a transformer having a secondary winding with a center tap, two relays, each having a coil and an armature, two voltage dividing networks, the anode of one of said tubes being connected through the coil of one of said relays to one side of said transformer secondary winding, said relay controlling a first external circuit, and the anode of the other of said tubes being connected through the coil of second of said relays to the same side of said transformer secondary winding, said second relay controlling a second external circuit, the cathodes of said tube being connected to said center tap, said voltage dividing network connected between said center tap and the other end of said transformer secondary winding, the output of one of said voltage dividing networks being connected to a grid of each tube through normally closed contacts of said relays, and the output of the other of said voltage dividing networks being connected to another grid of said tubes, whereby said tubes are normally maintained nonconductive.

2. The combination of claim 1 wherein the output of said second voltage dividing network may be short circuited through one of said switches mechanically coupled to said primary movable member, thereby removing said biasing voltage from the grid of one of said tubes.

3. In combination a dial indicator having a primary member movable in response to measurements and a mechanical linkage coupled thereto and to an indicating pointer that moves over a graduated scale, means attached to said primary member forming a common contact of a single-pole, double-throw switch, said switch having at least two additional contacts which alternatively form a closed circuit through the common contact, a source of alternating current energy, a transformer having a center tapped secondary, two Thyratron type discharge tubes having a plurality of electrodes, two voltage divider networks for producing biasing potentials, means connecting the output of the first of said networks to a primary control electrode of one of said discharge devices so that said tube may be nonconductive, means for shorting the output of the first of said networks through said switch to make said tube conductive, means connecting the output of the second of said networks to a secondary control electrode of each of said tubes, means for normally applying the output of said second network to the other of said discharge devices whereby said device is maintained non-conductive, means for applying the output of said second network to a secondary control electrode of the first discharge device whereby operation of the circuit is non-repetitive, means for interrupting the voltage output of said second network momentarily to initiate operation of the circuit whereby said second discharge device conducts, and means for applying the output of said first network through said additional contacts of said switch to the primary control electrode of said second discharge device to stop conduction of said discharge device.

4. In combination a dial indicator having a primary member movable in response to measurements and a mechanical linkage coupled thereto and to an indicating pointer that moves over a graduated scale, a gaseous discharge tube having a cathode, an anode, and at least one grid, a source of electrical energy, a first bias means for normally maintaining the grid of said tube at a potential negative with respect to the cathode, means to remove said first bias permitting the tube to conduct, said means comprising a switch mechanically coupled to said primary member of said dial indicator, a second bias means responsive to the conductivity of said tube to maintain a blocking voltage of said grid irrespective of the voltage on the grid caused by the first bias means to prevent the tube from conducting after said first means applies said first bias to interrupt the conductivity of said tube, and means connecting said source of electrical energy between the anode and cathode of said tube.

5. The combination of claim 4 wherein the means connecting said source of electrical energy to said anode includes a winding of a relay.

6. The combination of claim 5 wherein the means to obtain the first bias includes a voltage divider network connected across said source of electrical energy.

7. The combination of claim 6 wherein the means for obtaining said second bias includes a voltage divider network connected across said source of electrical energy.

RAYMOND H. MILLER.

REFERENCES CITED

The following references are of record in the file of this patent:

UNITED STATES PATENTS

| Number | Name | Date |
| --- | --- | --- |
| 1,893,205 | Hughes | Jan. 3, 1933 |
| 1,928,373 | Flatter | Sept. 26, 1933 |
| 2,018,435 | Bickel | Oct. 22, 1935 |
| 2,202,197 | Ewertz | May 28, 1940 |
| 2,261,495 | Ewertz | Nov. 4, 1941 |
| 2,318,938 | Hack | May 11, 1943 |
| 2,411,162 | King | Nov. 19, 1946 |
| 2,431,429 | Sepavich | Nov. 25, 1947 |
| 2,449,538 | Ackerman | Sept. 21, 1948 |